(12) United States Patent
Lu et al.

(10) Patent No.: US 10,360,434 B2
(45) Date of Patent: Jul. 23, 2019

(54) MULTI-PASS ADAPTIVE VOTING FOR NUCLEI DETECTION IN HISTOPATHOLOGICAL IMAGES

(71) Applicant: Case Western Reserve University, Cleveland, OH (US)

(72) Inventors: Cheng Lu, Cleveland Heights, OH (US); Anant Madabhushi, Shaker Heights, OH (US)

(73) Assignee: Case Western Reserve University, Cleveland, OH (US)

( * ) Notice: Subject to any disclaimer, the term of this patent is extended or adjusted under 35 U.S.C. 154(b) by 254 days.

(21) Appl. No.: 15/453,500

(22) Filed: Mar. 8, 2017

(65) Prior Publication Data

US 2018/0025490 A1   Jan. 25, 2018

Related U.S. Application Data

(60) Provisional application No. 62/366,358, filed on Jul. 25, 2016.

(51) Int. Cl.
    *G06K 9/00* (2006.01)
    *G06K 9/46* (2006.01)
    (Continued)

(52) U.S. Cl.
    CPC ......... *G06K 9/0014* (2013.01); *G06K 9/4633* (2013.01); *G06T 7/11* (2017.01); *G06T 7/136* (2017.01); *G06T 2207/10056* (2013.01); *G06T 2207/30024* (2013.01); *G06T 2207/30068* (2013.01); *G06T 2207/30088* (2013.01);
    (Continued)

(58) Field of Classification Search
    None
    See application file for complete search history.

(56) References Cited

U.S. PATENT DOCUMENTS

| 6,681,035 B1 * | 1/2004 | Bamford | G06K 9/0014 382/133 |
| 8,942,441 B2 * | 1/2015 | Nielsen | G06K 9/0014 382/128 |

(Continued)

OTHER PUBLICATIONS

Chang, Hang, Qing Yang, and Bahram Parvin. "Segmentation of heterogeneous blob objects through voting and level set formulation." Pattern recognition letters 28.13 (2007): 1781-1787. (Year: 2007).*

(Continued)

*Primary Examiner* — Samah A Beg
(74) *Attorney, Agent, or Firm* — Eschweiler & Potashnik, LLC

(57) ABSTRACT

Methods, apparatus, and other embodiments detect nuclei in histopathological images. One example method includes accessing a histopathology image that includes a plurality of pixels, generating a gradient field map based on the histopathology image, generating a refined gradient field map based on the gradient field map, calculating a voting map for a member of the plurality of pixels based, at least in part, on the refined gradient field map and a voting kernel, generating an aggregated voting map based on the voting map, computing a global threshold, and identifying a nuclear centroid based on the global threshold and the aggregated voting map.

20 Claims, 14 Drawing Sheets

(51) Int. Cl.
*G06T 7/11* (2017.01)
*G06T 7/136* (2017.01)

(52) U.S. Cl.
CPC ............... *G06T 2207/30096* (2013.01); *G06T 2207/30242* (2013.01)

(56) References Cited

U.S. PATENT DOCUMENTS

| | | | |
|---|---|---|---|
| 2009/0297007 A1* | 12/2009 | Cosatto | G06K 9/00147 382/131 |
| 2014/0294279 A1* | 10/2014 | Madabhushi | G06T 7/0014 382/133 |
| 2015/0254493 A1* | 9/2015 | Madabhushi | G06K 9/0014 382/133 |
| 2015/0254494 A1* | 9/2015 | Madabhushi | G06K 9/0014 382/133 |
| 2015/0254840 A1* | 9/2015 | Madabhushi | G06T 7/0012 382/131 |
| 2016/0253817 A1* | 9/2016 | Chen | G06K 9/0014 382/133 |
| 2016/0335478 A1* | 11/2016 | Bredno | G06K 9/00147 |
| 2017/0098310 A1* | 4/2017 | Chefd'hotel | G06T 7/0012 |
| 2018/0033138 A1* | 2/2018 | Prasanna | G06T 7/0012 |
| 2018/0075279 A1* | 3/2018 | Gertych | G01N 1/30 |
| 2018/0101949 A1* | 4/2018 | Wang | G01N 33/57496 |
| 2018/0253591 A1* | 9/2018 | Madabhushi | G06K 9/00147 |
| 2018/0253841 A1* | 9/2018 | Madabhushi | G06T 7/0012 |

OTHER PUBLICATIONS

Wählby, Carolina, et al. "Combining intensity, edge and shape information for 2D and 3D segmentation of cell nuclei in tissue sections." Journal of microscopy 215.1 (2004): 67-76. (Year: 2004).*
Parvin, Bahram, et al. "Iterative voting for inference of structural saliency and characterization of subcellular events." IEEE Transactions on Image Processing 16.3 (2007): 615-623. (Year: 2007).*
Irshad, Humayun, et al. "Methods for nuclei detection, segmentation, and classification in digital histopathology: a review—current status and future potential." IEEE reviews in biomedical engineering 7 (2014): 97-114. (Year: 2014).*
Ali, et al. "An Integrated Region, Boundary, Shape-Based Active Contour for Multiple Object Overlap Resolution in Histological Imagery." IEEE Transactions on Medical Imaging, vol. 31, Issue 7, pp. 1448-1460. Published Jul. 2012.
Ali, et al. Graphical Processing Unit Implementation of an Integrated Shape-Based Active Contour: Application to Digital Pathology. J Pathol Inform, vol. 12, Issue 13. Published Jan. 19, 2012.
U.S. Appl. No. 15/898,728, filed Feb. 19, 2018.

* cited by examiner 1110    1120    1130

MULTI-PASS ADAPTIVE VOTING FOR NUCLEI DETECTION IN HISTOPATHOLOGICAL IMAGES

CROSS REFERENCE TO RELATED APPLICATIONS

This application claims the benefit of U.S. Provisional Application 62/366,358 filed Jul. 25, 2016.

FEDERAL FUNDING NOTICE

The invention was made with government support under grants DK098503, CA179327, CA195152, CA199374, CA167811, and CA202752, awarded by the National Institutes of Health. Also, grants W81XWH-13-1-0418, and W81XWH-14-1-0323 awarded by the Department of Defense. The government has certain rights in the invention.

BACKGROUND

Nuclei detection is an initial step in the development of computer aided diagnosis and automated tissue grading schemes in the context of digital pathology images. Accurate nuclei detection in images that have poor staining or noise is a challenging task. Nuclear clusters that result from tissue sectioning artifacts also increase the challenge in accurately detecting nuclei. Manually identifying cellular nuclei, including identifying the location and extent of melanocyte invasion or breast cancer nuclei, is subjective and time consuming.

Uneven absorption of staining dyes by tissue, variations in staining procedures across different labs, or variations in exposure time for stain absorption by tissue, may result in significant differences in the quality of biochemical tissue staining and adversely affect the appearance of tissue and associated histologic primitives. Nuclei may appear to be clumped together, or appear to be blended in with the stroma, resulting in under-emphasis of nuclear boundaries. Uneven or imprecise staining may also result in hollow cores, further confounding nuclei detection.

Conventional approaches to nuclei detection and segmentation make assumptions about the staining quality of tissue and resulting image quality, and therefore may yield sub-optimal detection performance if the tissue preparation and staining is less than ideal or fails to meet the assumptions. Gradient based detection approaches require model initialization and yield worse results when used with poorly stained images. Supervised deep learning approaches are hindered by the often heterogeneous appearance of nuclei in different cohorts and the frequent availability of only a small number of representative training samples. Color and texture based approaches require consistent color or texture appearance in individual nuclei in order to work optimally. Thus, since nuclei detection is often a critical step in computer aided diagnosis and prognosis schemes in the context of digital pathology images, it would be beneficial to more accurately detect and count nuclei in histopathological images.

BRIEF DESCRIPTION OF THE DRAWINGS

The accompanying drawings, which are incorporated in and constitute a part of the specification, illustrate various example apparatus, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Nuclei detection is often a critical initial step in the development of computer aided diagnosis and automated tissue grading schemes in the context of digital pathology images. However, detecting nuclei in images with noise and poor or inconsistent staining is a challenging task. In breast cancer diagnosis, the Nottingham Histologic Score system is highly correlated to the appearance of cancer nuclei. In melanomas, the quantitative assessment of melanocytes within the epidermis is an important cue for disease presence. However, manually identifying cellular nuclei, including the location and extent of melanocyte invasion or breast cancer nuclei, can be subjective and time consuming.

Figure 1:
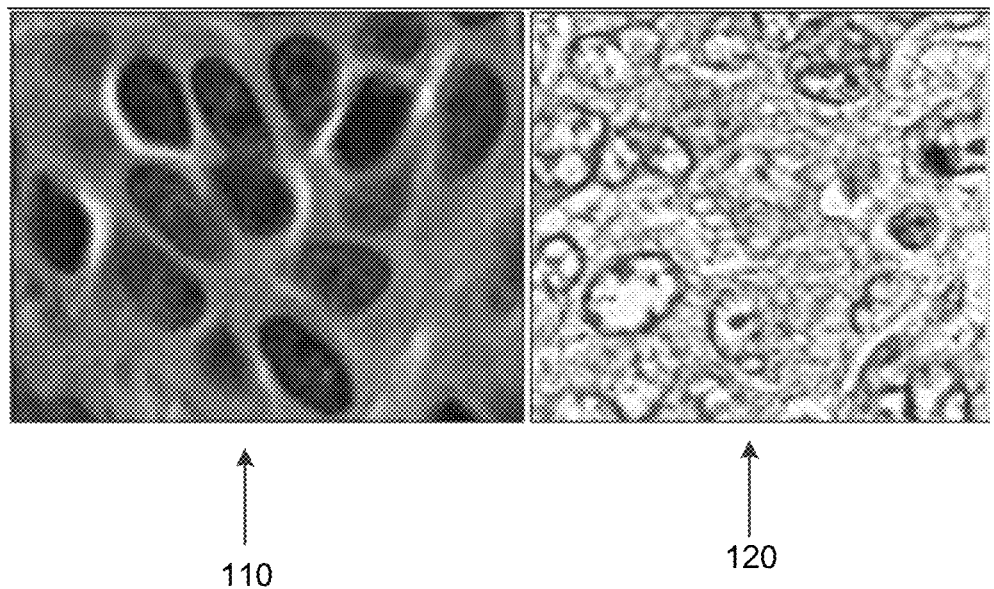
FIG. 1 illustrates example histopathological images.

Conventional approaches to nuclei detection make assumptions about the staining quality of the tissue and the resulting image quality, and may yield sub-optimal detection performance if the tissue preparation and staining is less than ideal. Due to the uneven absorption of the staining dyes by the tissue, variations in staining procedures adopted in different labs, or variations in the exposure time for stain absorption by the tissue, differences in the quality of biochemical tissue staining and resulting appearance of the slides can adversely affect the appearance of the tissue and the associated histologic primitives such as nuclei. For instance, over-staining of hematoxylin can cause adjacent nuclei to appear to be clumped together, while over-staining with eosin can cause the nuclei to blend in with the stroma and result in under-emphasis of the nuclear boundaries. Uneven and imprecise staining can also cause hollow cores within the centers of individual nuclei. FIG. 1 illustrates a first histological image 110 in which all nuclei are uniformly stained and have a consistent appearance. Second histological image 120 illustrates nuclei that have been inconsistently stained, and that demonstrate an ill-defined nuclear contour, with a hollow interior.

Conventional gradient based approaches for nuclear segmentation typically require model initialization. However, gradient based approaches rely on the presence of strong edges for the model to latch onto. Thus, gradient based approaches yield worse performance on poorly stained images where the nuclei may not be uniformly stained or where there are cavities within the nuclei.

The accuracy of conventional color and texture based segmentation approaches depends on consistent color or texture appearance across multiple nuclei. Color and texture based approaches that employ a Laplacian of Gaussian (LoG) filter to detect initial seed points representing nuclei may not reflect the true nuclei center when there is uneven stain distribution in the histologic image. Approaches that use a circular Hough transform assume that the shape of the underlying region of interest can be represented by a parametric function, such as a circle or ellipse. However, in poorly stained images, the Hough transform will fail when there is sufficient variation in the appearance of nuclear edges or the presence of clusters of edge fragments.

Conventional deep learning based approaches have the ability to learn discriminative features. However, the heterogeneous appearance of nuclei in different cohorts and the frequent availability of only a small number of representative training samples reduces the performance of supervised learning based approaches. Deep learning approaches require a large number of training samples since the learning process requires a large number of parameters to be learned. Thus, deep learning approaches tend to be heavily biased and sensitive to the choice of training set.

Figure 2:
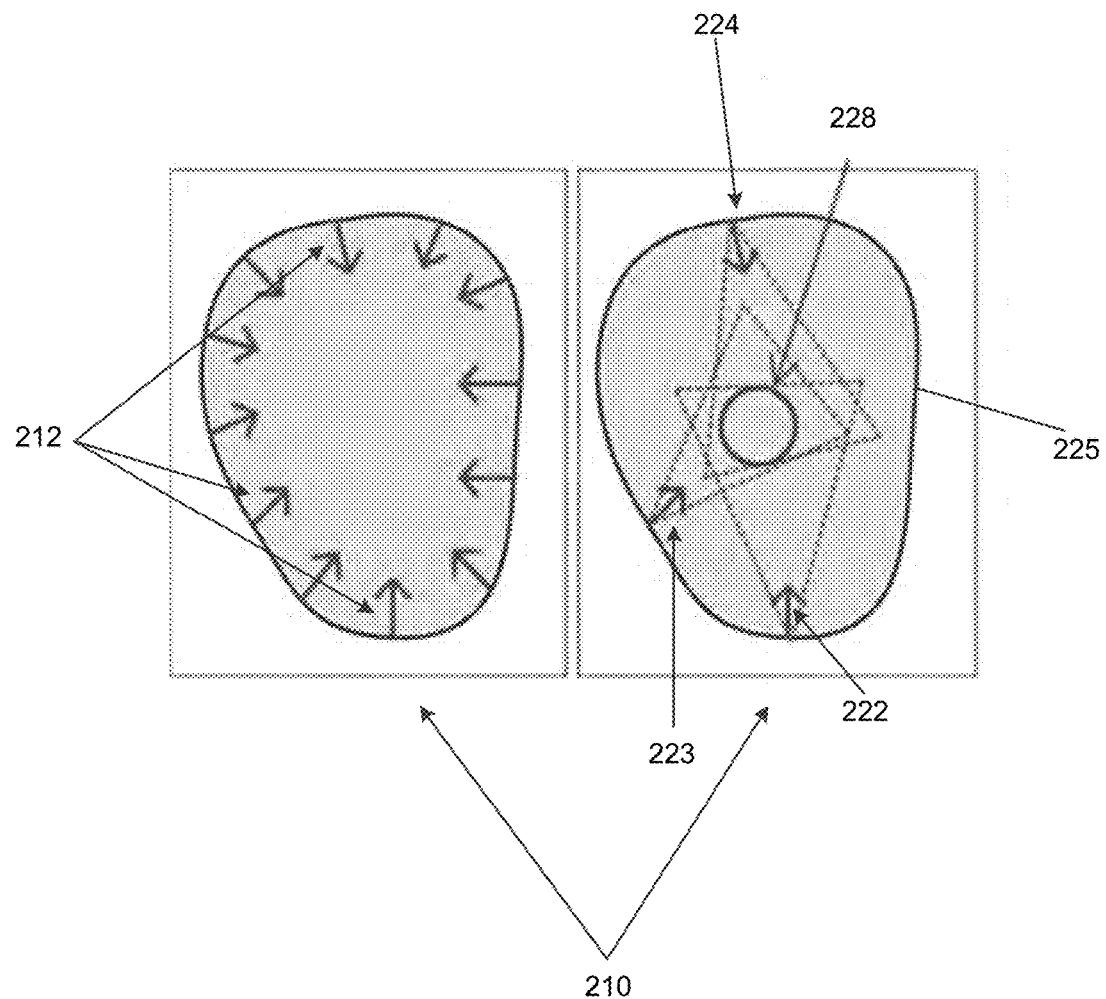
FIG. 2 illustrates an example voting procedure for detecting a nucleus.

Voting based nuclei detection techniques cluster circular symmetries along the radial line/inverse gradient direction on an object of interest's (e.g. nucleus) contour in order to infer the center of the object of interest. FIG. 2 illustrates two images of a synthetic phantom nucleus 210. Sample pixels or points on the nuclei contour with their respective inverse gradient directions are shown as arrows 212. FIG. 2 further illustrates nucleus 210 subjected to a voting procedure with three selected pixels 222, 223, and 224 on the contour 225. Note that for each selected pixel 222-224, a dotted triangle is used to represent an active voting area. The circular region 228 where three voting areas converge is a region with a high likelihood of containing a nuclear center.

Some voting-based nuclei detection approaches employ multi-pass voting (MPV) to calculate the centroid of overlapping nuclei. Other voting-based approaches employ single pass voting (SPV) followed by a mean-shift procedure to calculate the seed points of overlapping nuclei. Still other voting-based approaches employ an elliptic descriptor and single pass voting for detecting nuclei via a seed point detection scheme. Upon detecting nuclei, conventional voting-based approaches may employ a marker-controlled watershed algorithm to segment nuclei in H&E stained histology images. Conventional MPV approaches yields more accurate results compared to conventional SPV approaches in terms of nuclei detection. However, while the SPV approach may improve the overall efficiency of nuclear detection, the SPV approach needs an additional mean-shift clustering step to identify the local maxima in the voting map. This additional clustering step requires estimating additional parameters and increases the overall complexity of the SPV approach.

Figure 3:
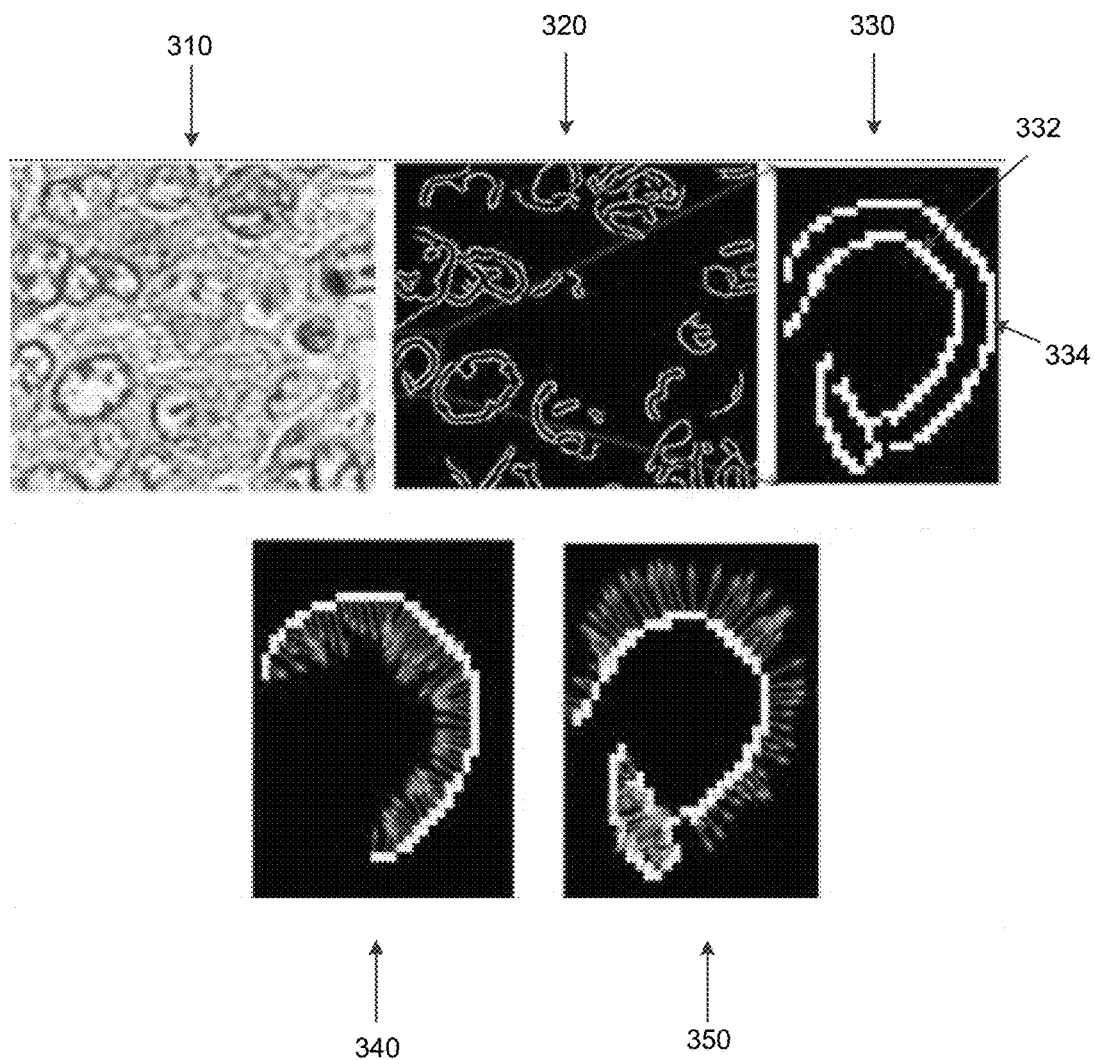
FIG. 3 illustrates an example edge-based voting approach.

In conventional voting-based techniques that utilize edge features, nuclei with hollow interiors may result in incorrect voting and the generation of a spurious detection result. FIG. 3 illustrates a conventional voting based approach. FIG. 3 includes a color image 310, a corresponding edge map 320, and a close-up image 330 of edges corresponding to a nucleus with a hollow core represented in the edge map 320. Close-up image 330 demonstrate two contours or edges: an inner contour 332 and an outer contour 334, which results in two edge fragments in the edge map, illustrated as outer contour edge fragment 340 and inner contour edge fragment 350. For outer contour edge fragment 340, the inverse gradients are pointing inwards, whereas for the inner contour edge fragment 350, the inverse gradients are pointing outwards. Thus, the inverse gradient obtained from the inner contour 332 minimally contributes towards identifying the nuclear centroid because the active voting area appears to be outside the nucleus, while the nuclear center should be within the nucleus. Thus, the assumption of conventional voting-based techniques that the generally symmetric nuclear contour will lead to center regions having higher vote counts may, in some situations, be incorrect.

Figure 4:
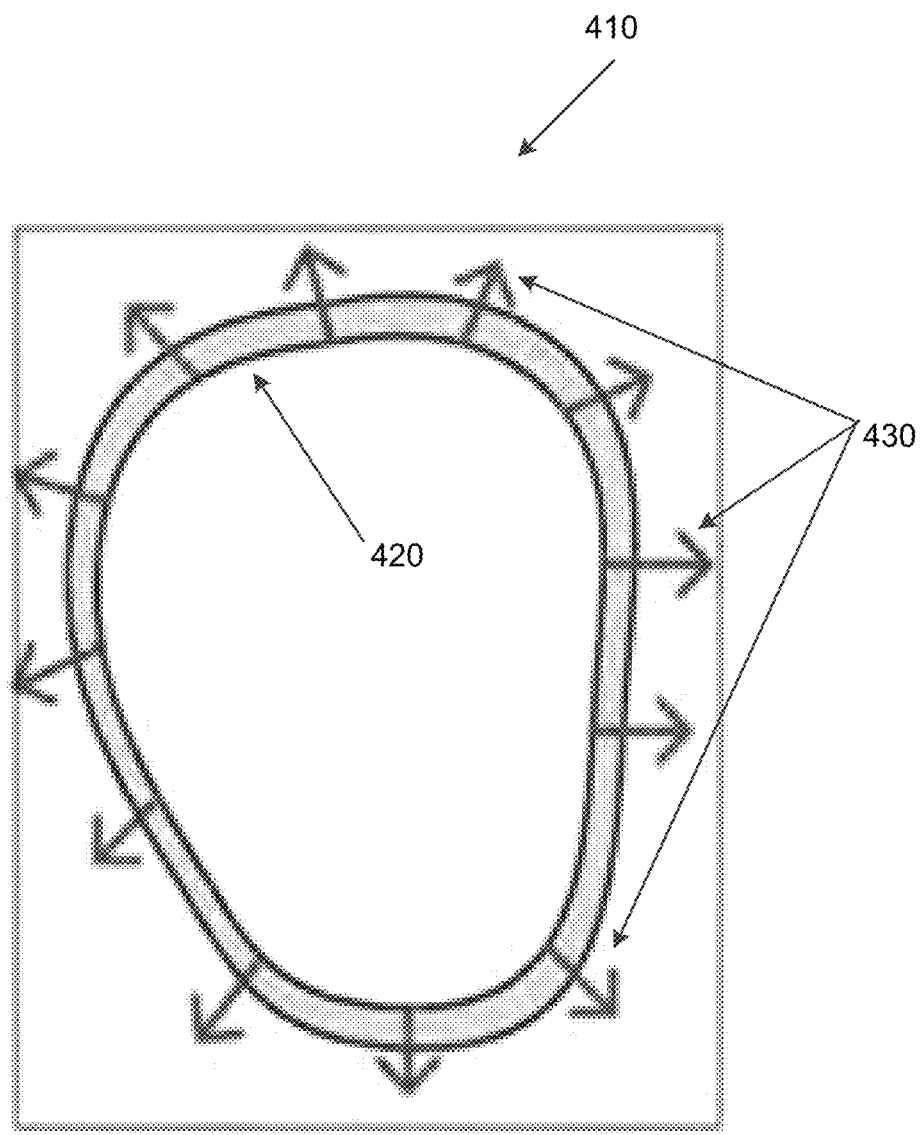
FIG. 4 illustrates an example synthetic nucleus with a hollow core.

FIG. 4 illustrates an example of a synthetic nucleus 410 with a hollow interior that further illustrates this problem with conventional approaches. In FIG. 4, several inverse gradient directions 430 are illustrated on the inner contour 420. In conventional voting-based approaches, inverse gradients from the inner contour 420 illustrated in FIG. 4 lead to spurious results in regions of clustered nuclei.

Figure 5:
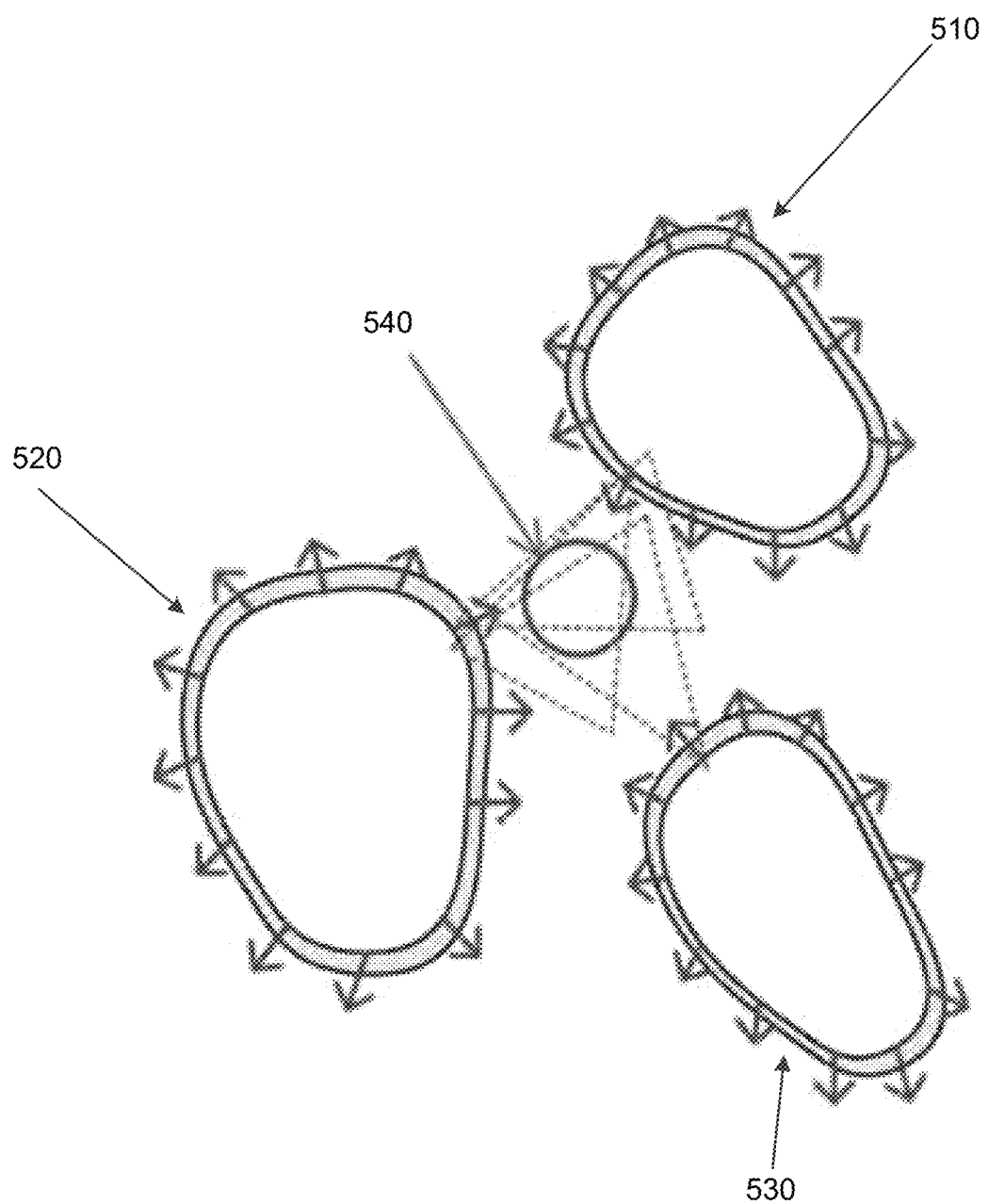
FIG. 5 illustrates synthetic clustered nuclei.

FIG. 5 illustrates three synthetic nuclei 510, 520, and 530 that have hollow regions. In a conventional voting approach, due to the proximity of these three nuclei 510, 520, and 530 with each other, the circular region 540 may receive a large number of votes and thus may lead to a potential false positive nuclei detection. Thus, conventional existing voting-based techniques tend to generate many false positive detection results when confronted with hollow core or clustered nuclei.

Example methods and apparatus detect cellular nuclei in histopathological images using multi-pass adaptive voting (MPAV). MPAV adaptively uses gradient information of pixels on nuclear contours or edge fragments to generate more accurate detection results by exploiting the symmetry of nuclei. Example methods and apparatus facilitate detecting nuclei with greater accuracy than conventional voting-based approaches by adaptively selecting and refining pixels that will be used in voting on candidate nuclei. In one embodiment, example methods and apparatus access an image of a region of interest, and generate a gradient field based on the image using image smoothing and edge detection. A refined gradient field is generated from the gradient field by correcting or removing gradients that have a direction pointing away from the center of a candidate nucleus. The refined gradient field is then employed in multi-pass voting to guide edge pixels for generating a nuclear voting map. A global threshold is applied to the voting map to obtain candidate nuclear centroids.

MPAV includes generating an active voting area for a pixel located on an edge in a histopathology image. In one embodiment, for a pixel located at (x;y), an active voting area $A(x;y; r_{min}; r_{max}; \alpha; \delta)$ is generated, where $r_{min}$ and $r_{max}$ indicate the radial range of the active voting area A. $r_{min}$ may be set to 1 without loss of reliability, although in other embodiments other values of $r_{min}$ may be employed. An active voting area may thus be represented as $A(x;y; r_{max}; \alpha; \delta)$. In this embodiment, a represents the inverse gradient direction at a pixel (x;y), and $\delta$ indicates the angular range.

Figure 6:
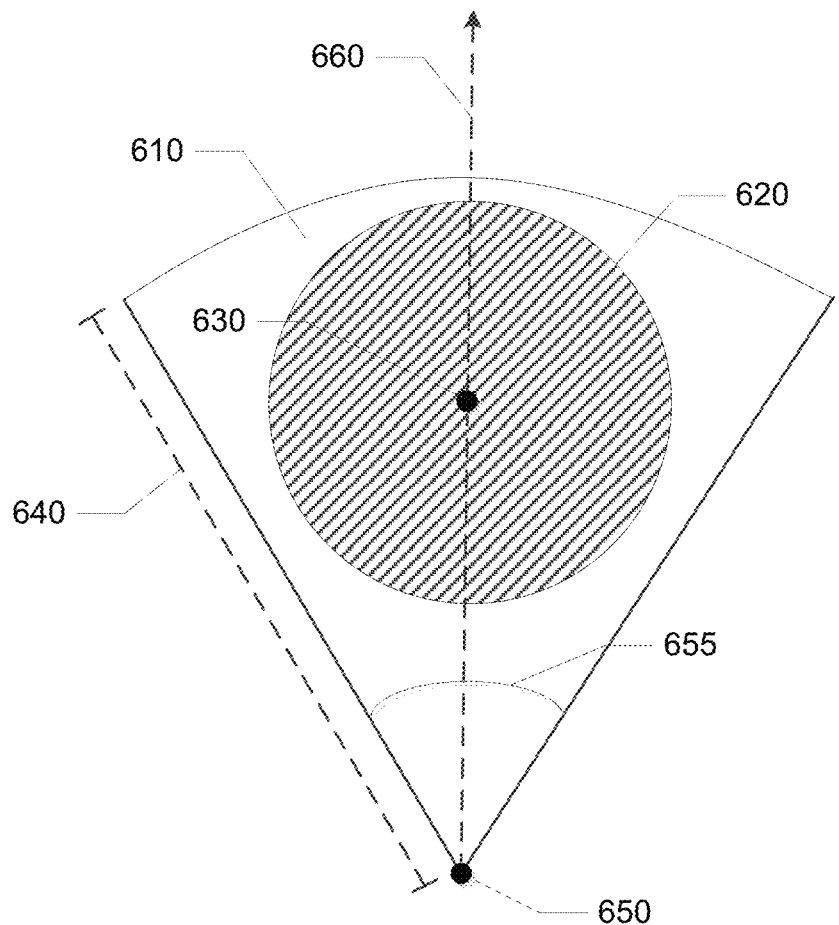
FIG. 6 illustrates an example active voting area.

One example of an active voting area associated with a pixel 650 located at (x;y) is illustrated in FIG. 6. Within the voting area A 610, a kernel 620, which in this embodiment is a 2-D Gaussian kernel K(u; v; σ; A), is placed at pixel 630 (u;v) to diffuse the votes. Thus, pixels close to pixel 630 (u;v) will receive a higher number of votes than pixels farther away from (u;v). As illustrated in FIG. 6, the direction α of inverse gradient at pixel 650 (x;y) is indicated by element 660, and the angular range δ is indicated at 655. $r_{max}$ is illustrated by element 640.

By increasing the accuracy with which nuclei are detected, example methods and apparatus produce the concrete, real-world technical effect of reducing the time required to evaluate medical imagery while increasing the accuracy of the evaluation. Additionally, example apparatus and methods increase the probability that at-risk patients receive timely treatment tailored to the particular pathology they exhibit. The additional technical effect of reducing the expenditure of resources and time on patients who are less likely to suffer recurrence or disease progression is also achieved. Example methods and apparatus thus improve on conventional methods in a measurable, clinically significant way.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Example methods and apparatus define an active voting area. FIG. 6 illustrates one example of an active voting area in a histopathology image suitable for use by methods and apparatus described herein. For a pixel in the histopathology image located at co-ordinates (x, y) 650, an active voting area A 610 may be defined as A(x,y; $r_{min}$, $r_{max}$, α, δ), where $r_{min}$ and $r_{max}$ indicate the radial range of the voting area A 610. In one embodiment, $r_{min}$ may be set to 1 without loss of reliability. In this embodiment, α represents the inverse gradient 660 at the pixel located at co-ordinates (x, y) 650, and δ represents the angular range 655. Within the active voting area A 610, a kernel K 620 is placed at co-ordinates (u, v) 630 to diffuse votes, such that pixels closer to (u, v) will receive more votes than pixels located farther away from (u, v). In one embodiment, the kernel 620 may be a two-dimensional (2D) Guassian kernel K(u,v; σ, A). In this embodiment, a represents the standard deviation of a Gaussian distribution. In one embodiment, where the image is a 40× magnification image with a 0.248 µm pixel size, $r_{max}=40$, and σ=4.

Figure 7:
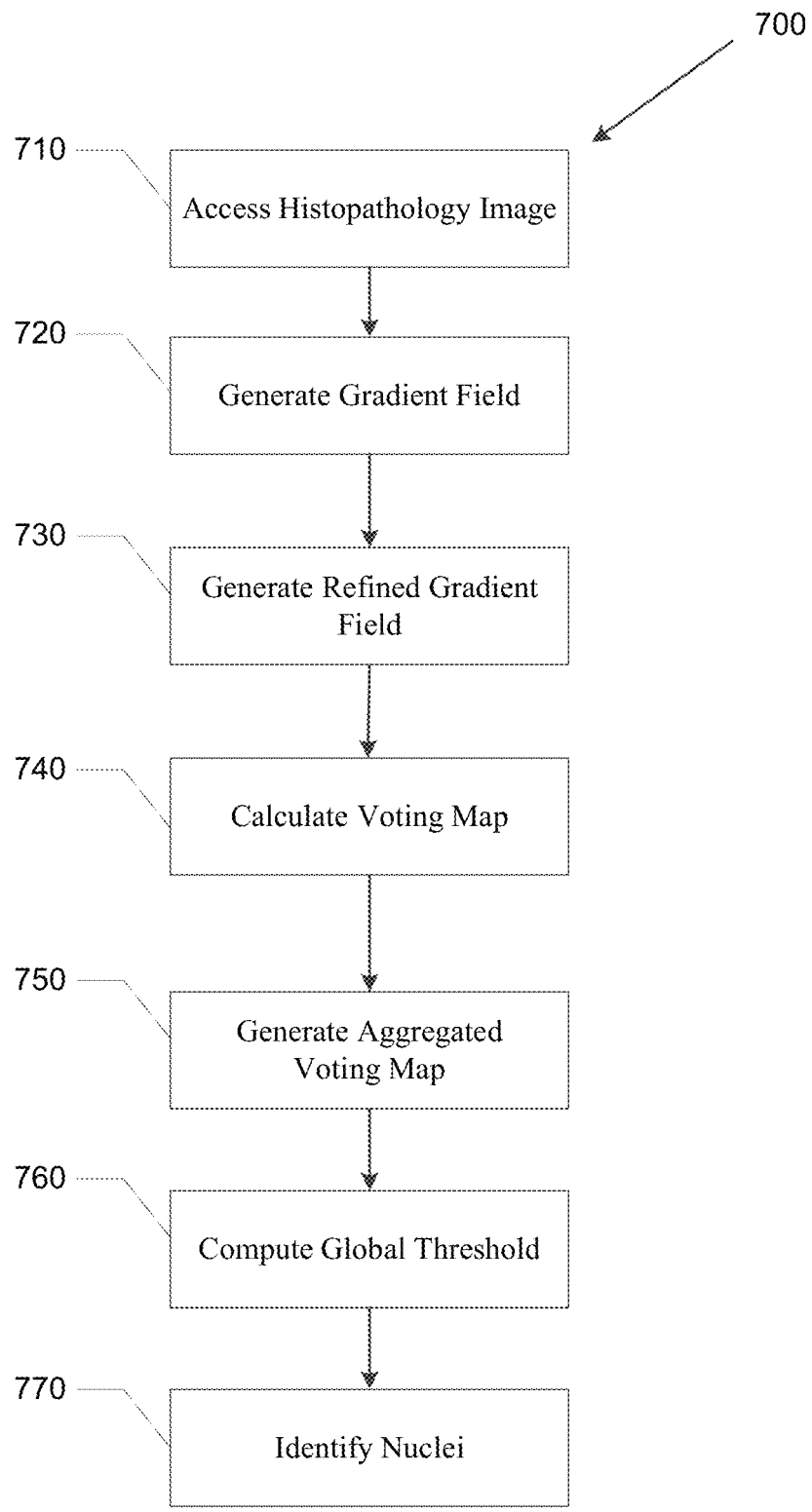
FIG. 7 illustrates an example computerized method for detecting nuclei.

FIG. 7 illustrates an example computerized method 700 for detecting cellular nuclei in a histopathological image. Method 700 includes, at 710 accessing a histopathology image of a region of tissue. Accessing the histopathology image may include retrieving electronic data from a computer memory, receiving a computer file over a computer network, or other computer or electronic based action. The histopathology image includes a plurality of pixels. A pixel in the histopathology image may have a location defined as (x, y). In one embodiment, the histopathology image may be an H&E stained image of a tissue slide, a tissue slide stained with CD31 antibody and hematoxylin, or a tissue slide stained with Ki-67. In another embodiment, other image types, modalities, resolutions, scales, slices per scan, or image dimensions may be used.

Method 700 also includes, at 720, generating a gradient field map. The gradient field map is based on the histopathology image. In one embodiment, generating the gradient field map includes separating different stains within the histopathology image. In one embodiment, different stains are separated using an unsupervised sparse non-negative matrix factorization (SNMF) based color deconvolution approach. In another embodiment, other approaches may be employed to separate different stains. In this embodiment, a single stain image is denoted as I, and two-dimensional (2D) image coordinates for the single stain image I are represented as (x, y). Image noise may be reduced by producing a smooth image $I_s$. In one embodiment, the smooth image $I_s$ is obtained by convolving I with a Guassian kernel $$K(x, y, \sigma) = \frac{1}{\sqrt{2\pi\sigma^2}} e^{-(x^2+y^2)/2\sigma^2}.$$

Other image smoothing approaches may be employed.

Generating the gradient field map further includes computing an inverse gradient G for the pixel located at (x, y). Inverse gradient G is generated as $$G(x, y) = \left(-\frac{dI_s(x, y)}{dx}, -\frac{dI_s(x, y)}{dy}\right),$$

where $$\frac{dI_s(x, y)}{dx}$$

represents the gradient along the X axis, and $$\frac{dI_s(x, y)}{dy}$$

represent the gradient along the Y axis.

A nuclear edge is obtained by applying an edge detection technique to $I_s$. In one embodiment, an edge detection technique based on the Canny operator is applied to $I_s$. In another embodiment, another, different edge detection approach may be employed. Pixels that belong to nuclear edges may be employed as voting pixels. The pixel set that belongs to a nuclear edge is represented as E. Generating the gradient field map further includes generating an updated gradient map G'. G' may be defined as:

$$G'(x, y) = \begin{cases} Q(x, y), & \text{if } (x, y) \in E \\ 0, & \text{otherwise} \end{cases}.$$

Thus the gradient field map includes inverse gradients associated with edge pixels.

Method 700 also includes, at 730, generating a refined gradient field map. The refined gradient field map is based on the gradient field map. Recall that at 720, method 700 obtains an edge map that reflects which pixels may join in the voting procedure. Since in the scenario in which there are staining inconsistencies, the inverse gradients on an inner edge fragment may not accurately contribute to the voting of nuclear centroid and may introduce spurious votes in the voting map, example methods and apparatus refine the inverse gradient of pixels that will join in the voting procedure. Example methods and apparatus adaptively select the valid voting pixels and use their associated gradient information during the voting stage. Method 800 is one approach to generating a refined gradient field map by adaptively selecting valid voting pixels and associated inverse gradients.

Figure 8:
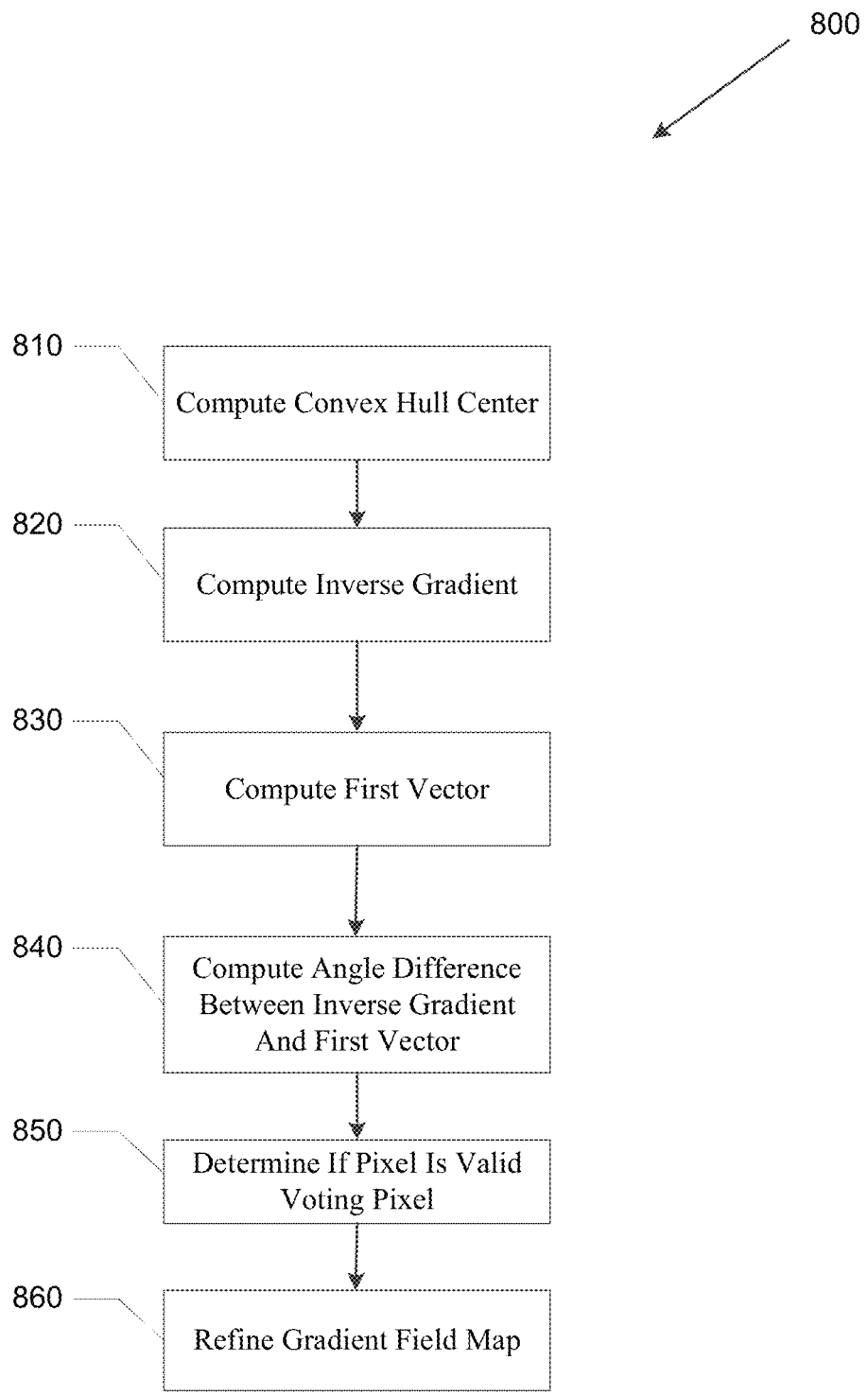
FIG. 8 illustrates an example computerized method for refining a gradient field.

FIG. 8 illustrates an example method 800 for generating a refined gradient field map. Method 800 is suitable for use by methods and apparatus described herein, including method 700, method 1300, or apparatus 1200. Method 800 includes, at 810, computing a convex hull center associated with a fragment of the edge map. In one embodiment, for an edge fragment $E_{i, i \in \{1, \ldots, Q\}}$, in the edge map, example methods and apparatus compute a corresponding convex hull, denoted as $H_i$, and identify the center of the convex hull, denoted as $C_i$.

Method 800 also includes, at 820 computing an inverse gradient for a pixel in the fragment of the edge map. Recall that inverse gradient G is generated as:

$$G(x, y) = \left(-\frac{dI_s(x, y)}{dx}, -\frac{dI_s(x, y)}{dy}\right),$$

where $$\frac{dI_s(x, y)}{dx}$$

represents the gradient along the X axis, and $$\frac{dI_s(x, y)}{dy}$$

represent the gradient along the Y axis. In another embodiment, method 800 may employ an inverse gradient for a pixel in the fragment of the edge map that was computed by method 700 at 720.

Method 800 also includes, at 830, computing a first vector formed by the pixel and the center of the convex hull. For example, for a pixel in the current edge fragment, $p(x, y) \in E_i$, method 800 computes a vector $\overrightarrow{C_i p}$, formed by the current pixel, p, and the center of $C_i$.

Method 800 also includes, at 840, computing an angle difference between the inverse gradient and the first vector. In one embodiment, method 800 computes the angle difference $\theta(x, y)$ between the vector $\overrightarrow{C_i p}$ and the inverse gradient direction as:

$$\theta(x, y) = \left| \arctan\left(\frac{\frac{d\overrightarrow{C_i p}}{dy}}{\frac{\overrightarrow{C_i p}}{dx}}\right) - \arctan\left(\frac{\frac{-dI_s(x, y)}{dy}}{\frac{-dI_s(x, y)}{dx}}\right) \right|$$

Figure 10A:
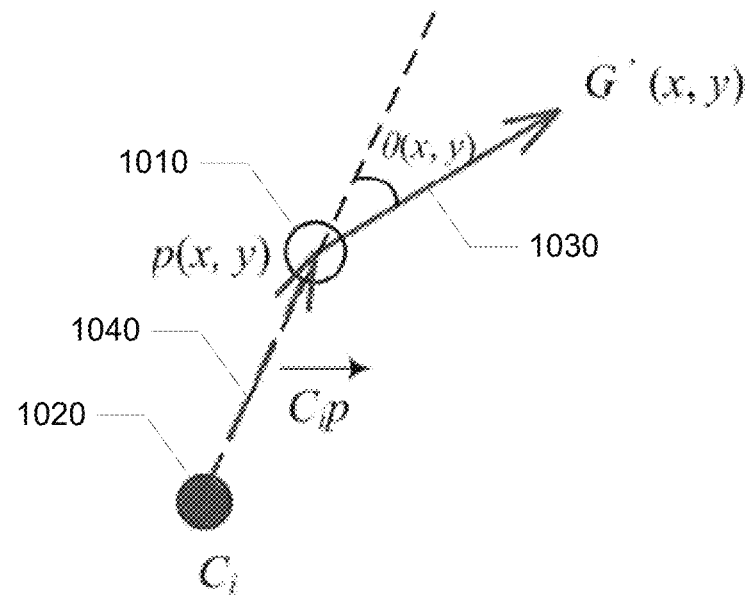
FIGS. 10($a$) and 10($b$) illustrate an example approach to angle difference computation.
Figure 10B:
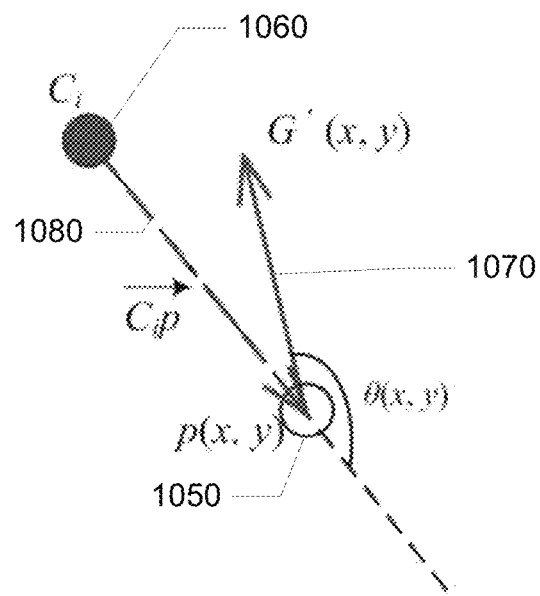

Two illustrative examples of a procedure for angle difference computation suitable for use by methods and apparatus described herein are shown in FIGS. 10(*a*) and 10(*b*). In FIG. 10(*a*), a hollow circle 1010 represents a pixel $p(x,y) \in E_i$ and a solid circle 1020 represents the center of $C_i$. FIG. 10(*a*) illustrates a case where $$\theta(x, y) > \frac{\pi}{2},$$

in which the angle $\theta(x, y)$ is formed by inverse gradient 1030 and first vector 1040. FIG. 10(*b*) illustrates a case where $$\theta(x, y) < \frac{\pi}{2},$$

formed by inverse gradient 1070 and first vector 1080. In FIG. 10(*b*), a hollow circle 1050 represents a pixel $p(x,y) \in E_i$ and a solid circle 1060 represents the center of $C_i$.

Method 800 also includes, at 850, determining if the pixel is a valid voting pixel. In one embodiment, method 800 determines if the pixel is a valid voting pixel according to the heuristic:

$$L_{p(x,y)} = \begin{cases} \text{valid}, & \text{if } |\theta(x, y)| > \frac{\pi}{2} \\ \text{invalid}, & \text{otherwise} \end{cases}$$

where $L_{p(x,y)}$ denotes a label for the pixel p(x, y). Inverse gradients that point toward the hull centroid have a positive contribution towards the symmetry voting. Inverse gradients that point outwards from the hull centroid contribute negatively and may result in false positive nuclei detection. For example, FIG. 10(*a*) illustrates an example in which the pixel 1010 is determined to be an invalid voting pixel. FIG. 10(*b*) illustrates an example in which the pixel 1050 is determined to be a valid voting pixel. In another embodiment, other approaches to determining the validity of pixel for voting may be used. For example, threshold angle differences other than $$\frac{\pi}{2}$$

may be used.

In one embodiment, method 800, upon determining that the angle difference is within a threshold magnitude, classifies the pixel as a valid voting pixel. For example, upon determining that the angle difference is greater than $$\frac{\pi}{2},$$

method 800 may classify the pixel as a valid voting pixel.

Method 800 also includes, at 860, refining the gradient field map. The refined gradient field map is based, at least in part, on the inverse gradient. In one embodiment, method 800 generates the refined gradient field map G' using a first strategy GS1. In another embodiment, method 800 generates the refined gradient field map G' using a second strategy GS2. First strategy GS1 includes ignoring pixels that are labeled as invalid, and removing the inverse gradients associated with the invalid pixels from the gradient field. When using first strategy GS1, method 800 generates the refined gradient field map G'$_1$(x, y) as:

$$G'_1(x, y) = \begin{cases} 0, & \text{if } L_{p(x,y)} = \text{invalid} \\ \left(-\frac{dI_s(x, y)}{dx}, -\frac{dI_s(x, y)}{dy}\right), & \text{if } L_{p(x,y)} = \text{valid} \end{cases}$$

Second strategy GS2 includes setting the inverse gradient direction of an inverse gradient associated with an invalid voting pixel to the reverse direction. When using second strategy GS2, method 800 generates the refined gradient field map G'$_2$(x, y) as:

$$G'_2(x, y) = \begin{cases} \left(\frac{dI_s(x, y)}{dx}, \frac{dI_s(x, y)}{dy}\right), & \text{if } L_{p(x,y)} = \text{invalid} \\ \left(-\frac{dI_s(x, y)}{dx}, -\frac{dI_s(x, y)}{dy}\right), & \text{if } L_{p(x,y)} = \text{valid} \end{cases}$$

First strategy GS1 ignores pixels with invalid gradients and reduces the number of pixels that are used in the voting procedure. First strategy GS1 produces a more accurate nuclei detection result than conventional approaches. Methods and apparatus described herein employing first strategy GS1 identify nuclei with an AUC of at least 0.78. First strategy GS1 also reduces the computational complexity of example methods and apparatus compared to conventional approaches, and thus improves the performance of CADx systems, cellular nuclei counting systems, or other systems that identify cellular nuclei in histopathology images by reducing the time, energy, and computational resources required to detect cellular nuclei in a histopathology image. Second strategy GS2 refines the gradient direction of pixels with invalid gradients and thus produces a more accurate result than conventional voting based approaches. Methods and apparatus described herein employing second strategy GS2 identify nuclei with an AUC of at least 0.79. Methods and apparatus described herein may use one of first strategy GS1 or second strategy GS2, or a combination of both strategies. Methods and apparatus described herein thus improve the performance of a computer or CADx system that employs methods or apparatus described herein.

Figure 9:
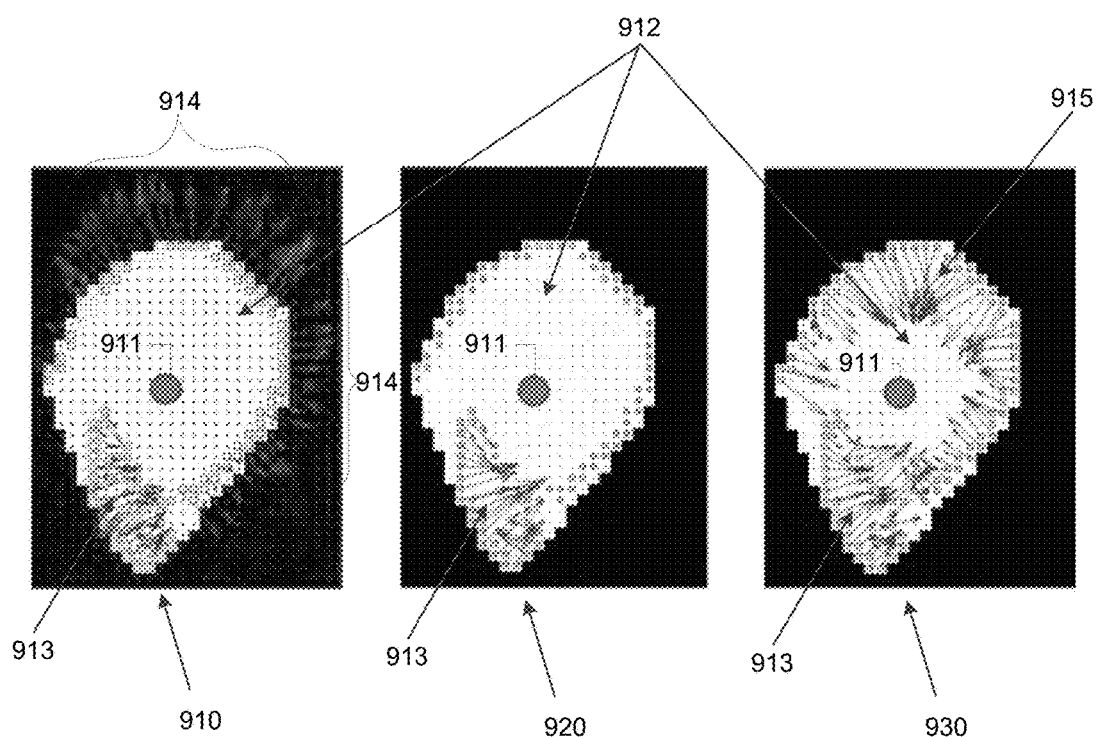
FIG. 9 illustrates an example of inverse gradient refinement for edge pixels.

FIG. 9 illustrates an example of inverse gradient refinement for edge pixels. In FIG. 9, three examples of a convex hull with a center $C_i$ 911 associated with an edge fragment are illustrated. Element 910 illustrates a convex hull with no gradient refinement strategy applied. Element 920 illustrates the convex hull with first strategy GS1 applied. Element 930 illustrates the convex hull with second strategy GS2 applied. In 910, 920, and 930, the solid circle 911 indicates the actual center $C_i$ of the convex hull. The light region 912 represents the convex hull region for the outer edge shown, whereas the original pixels belonging to the edge fragment, i.e., pixels p(x;y) 2 $E_i$, are marked with rectangles and stars. In 910, arrows 913 and arrows 914 represent the inverse gradient information. Note that most of the inverse gradients are pointing out from the nuclear center, as indicated by arrows 914. The inverse gradients associated with arrows 914 are invalid gradients associated with invalid voting pixels, whereas the valid inverse gradients associated with valid voting pixels are indicated by arrows 913. Gradient refinement results using the first strategy GS1, in which the gradient value of invalid gradient pixels are set to 0, is illustrated at 920. In 920, arrows 913 indicate the remaining valid inverse gradients. Gradient refinement results using the second strategy GS2, in which the gradient sign of invalid gradient pixels are reversed, is illustrated at 930. In 930, arrows 913 indicate the remaining valid inverse gradients, while arrows 915 indicate the reverse inverse gradients.

Method 700 also includes, at 740, calculating a voting map for a member of the plurality of pixels. Method 700 calculates the voting map based, at least in part, on the refined gradient field map and a voting kernel. Calculating the voting map includes initializing voting parameters. Voting parameters initialized may include a radial maximum range $r_{max}$, a maximum angular range $\delta_{max}$, and an iteration number N. A set of angular ranges Δ may be defined as:

$$\Delta = \left\{ \delta_N = \delta_{max}, \delta_{N-1} = \frac{\delta_{max}(N-1)}{N}, \ldots \delta_1 = \frac{\delta_{max}}{N} \right\}.$$

In one embodiment, radial maximum range $r_{max}$=40, and iteration number N=3. In one embodiment, the set of angular ranges $$\Delta = \left\{ \frac{\pi}{4}, \frac{\pi}{7}, \frac{\pi}{284} \right\}.$$

Other values for the radial maximum range, iteration number, or set of angular ranges may be employed.

An initial voting direction α for a pixel in the voting map are based on the inverse gradient map G'. Recall that refined gradient field map G' may be generated using first strategy GS1, second strategy GS2, or combination of first strategy GS1 and seconds strategy GS2. Thus, the initial voting direction for a pixel may be defined as:

$$\alpha(x, y) = \frac{\left(\frac{dI_s(x, y)}{dy}, \frac{dI_s(x, y)}{dx}\right)}{\sqrt{\frac{dI_s(x, y)^2}{dy}, \frac{dI_s(x, y)^2}{dx}}}$$

where $$\frac{dI_s(x, y)}{dx}$$

represents the gradient along the X axis, and $$\frac{dI_s(x, y)}{dy}$$

represents the gradient along the Y axis.

Calculating the voting map further includes updating the voting map. The voting map is updated iteratively. For a pixel $(x,y) \in E$ and $G'(x,y) \neq 0$, method 700 computes a vote image $V_i$, for the ith iteration. In one embodiment, computing the vote image $V_i$, for the ith iteration may be done using:

$$V_i\left(x, y; r_{max}, \alpha, (\delta_i)\right) =$$

$$V_i(x, y; r_{max}, \alpha, \delta_i) + \sum_{(u,v) \in A(x,y; r_{max}, \alpha, \delta_i)} G'(x+u, y+v;$$

$$r_{max}, \delta_i) K(u, v; \sigma, A(x, y); r_{max}, \alpha, \delta_i))$$

where $K(u, v; \sigma, A(x,y;r_{max}, \alpha, \delta_i))$ represents the kernel placed at location $(u, v)$ within an active voting region $A(x, y; r_{max}, \alpha, \delta_i)$.

Calculating the voting map further includes updating the voting direction. For a pixel $(x,y) \in E$ and $G'(x,y) \neq 0$, method 700 computes an updated voting direction using:

$$\alpha(x, y) = \frac{(u^* - x, v^* - y)}{\sqrt{(u^* - x)^2 + (v^* - y)^2}},$$

where $(u^*, v^*) = \text{argmax}_{(u,v) \in A(x,y;r_{max},\delta_i)} V_i(u,v; r_{max}, \delta_i)$. In one embodiment, determining $(u^*, v^*)$ includes updating the voting direction for a pixel$(x, y)$ located at $(u^*, v^*)$, which is the pixel that has the maximum vote value within the active voting region A.

Calculating the voting map further includes iteratively adjusting parameters. Method 700 computes a smaller angular value $\delta_{i-1}$ and sets $i=i-1$. Method 700 may terminate iteratively adjusting parameters when $i=1$. In another embodiment, method 700 may terminate iteratively adjusting parameters upon another, different termination condition.

Method 700 also includes, at 750, generating an aggregated voting map. The aggregated voting map is based on the voting map. The aggregated voting map contains voting information from a plurality of pixels that join in the voting procedure. The aggregated voting may be computed iteratively, for N iterations. Thus the aggregated voting map may be denoted as $V_N$. In one embodiment, information from all the pixels that are determined to be valid voting pixels is included in the aggregated voting map. In another embodiment, information from less than all of the valid voting pixels may be included. The proportion of valid voting pixels from which information is included in the aggregated voting map may be user adjustable.

Method 700 also includes, at 760, computing a global threshold. In one embodiment, the global threshold is computed using an automated Ostu's threshold approach. Ostu's threshold approach is described in N. Otsu, "A threshold selection method from gray-level histograms," *Systems, Man and Cybernetics, IEEE Transactions on*, vol. 9, no. 1, pp. 62-66, 1979. In another embodiment, other approaches may be employed to compute the global threshold. In examples described herein, the global threshold may be denoted as $T_D$.

Method 700 also includes, at 770, identifying a nuclear centroid represented in the histopathology image. Method 700 identifies the nuclear centroid or nucleus based on the global threshold $T_D$ and the aggregated voting map $V_N$. Method 700 applies the global threshold $T_D$ to the aggregated voting map $V_N$ to obtain a binary image. A centroid of connected components within the binary image is identified as a nuclear centroid.

In one embodiment, method 700 further includes controlling an automated nuclei counting system, an automated cell counter system, or a CADx system to count nuclei in a histopathology image based, at least in part, on the nuclear centroid identified at step 770 of method 700.

Figure 11:
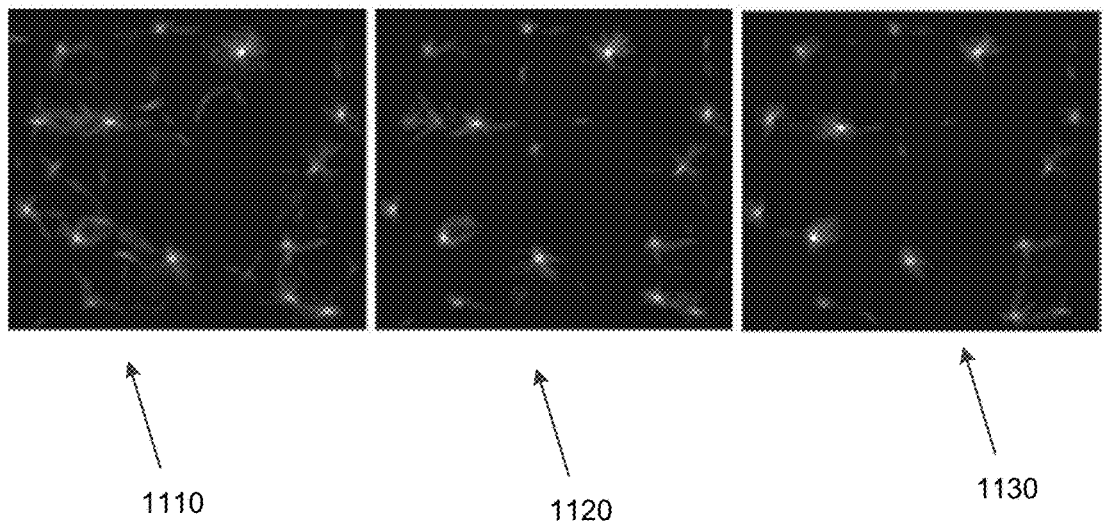
FIG. 11 illustrates example voting images.

FIG. 11 illustrates three examples of voting images generated from a single histopathology image by a conventional voting approach, by example methods and apparatus employing first strategy GS1, and by example methods and apparatus employing second strategy GS2. First voting or binary image 1110 is generated by a conventional approach. Second voting or binary image 1120 is generated using first strategy GS1. Third voting or binary image 1130 is generated using second strategy GS2. In voting or binary images 1110-1130, darker regions indicate fewer votes, and brighter regions indicate more votes. Example methods and apparatus facilitate generating more specific and accurate nuclei detection results as indicated by the fewer brighter regions in third voting or binary image 1130 compared to first voting or binary image 1110.

Example methods and apparatus facilitate more accurate detection of cellular nuclei than conventional approaches that are susceptible to sub-optimal results caused by poorly or inconsistently stained tissue slides. Example methods and apparatus thus improve on conventional methods by detecting cellular nuclei with greater accuracy, less computational complexity, and with less subjective variability than conventional methods. Example methods and apparatus may thus have the real-world, quantifiable effect of improving patient outcomes because accurate cellular nuclei detection is a critical initial step in computer aided diagnosis and prognosis.

Figure 13:
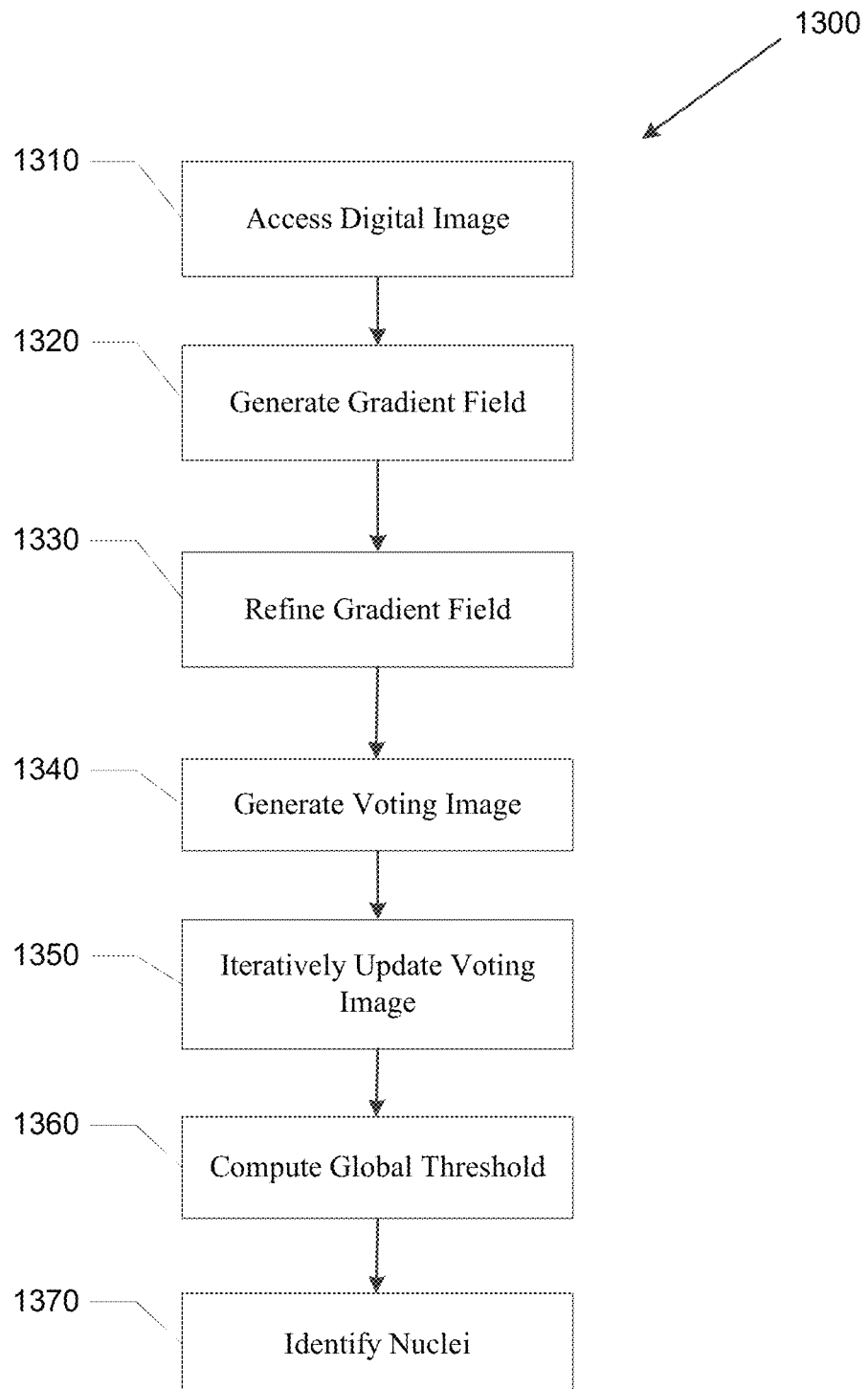
FIG. 13 illustrates an example computerized method for detecting nuclei in a digital histopathology image.

While FIGS. 7, 8, and 13 illustrate various actions occurring in serial, it is to be appreciated that various actions illustrated in FIG. 7, FIG. 8, or FIG. 13 could occur substantially in parallel. By way of illustration, a first process could access a histopathological image, a second process could generate a gradient field, and a third process could refine the gradient field. While three processes are described, it is to be appreciated that a greater or lesser number of processes could be employed and that lightweight processes, regular processes, threads, and other approaches could be employed.

Methods, apparatus, and other embodiments described herein are described with reference to the drawings in which like reference numerals are used to refer to like elements throughout, and where the illustrated structures are not necessarily drawn to scale. Embodiments are to cover all modifications, equivalents, and alternatives falling within the scope of the invention. In the figures, the thicknesses of lines, layers and/or regions may be exaggerated for clarity. Nothing in this detailed description (or drawings included herewith) is admitted as prior art.

Like numbers refer to like or similar elements throughout the description of the figures. When an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In one example, a method may be implemented as computer executable instructions. Thus, in one example, a computer-readable storage device may store computer executable instructions that if executed by a machine (e.g., computer) cause the machine to perform methods described or claimed herein including method 700, method 800, and method 1300. While executable instructions associated with the listed methods are described as being stored on a computer-readable storage device, it is to be appreciated that executable instructions associated with other example methods described or claimed herein may also be stored on a computer-readable storage device. In different embodiments the example methods described herein may be triggered in different ways. In one embodiment, a method may be triggered manually by a user. In another example, a method may be triggered automatically.

Figure 12:
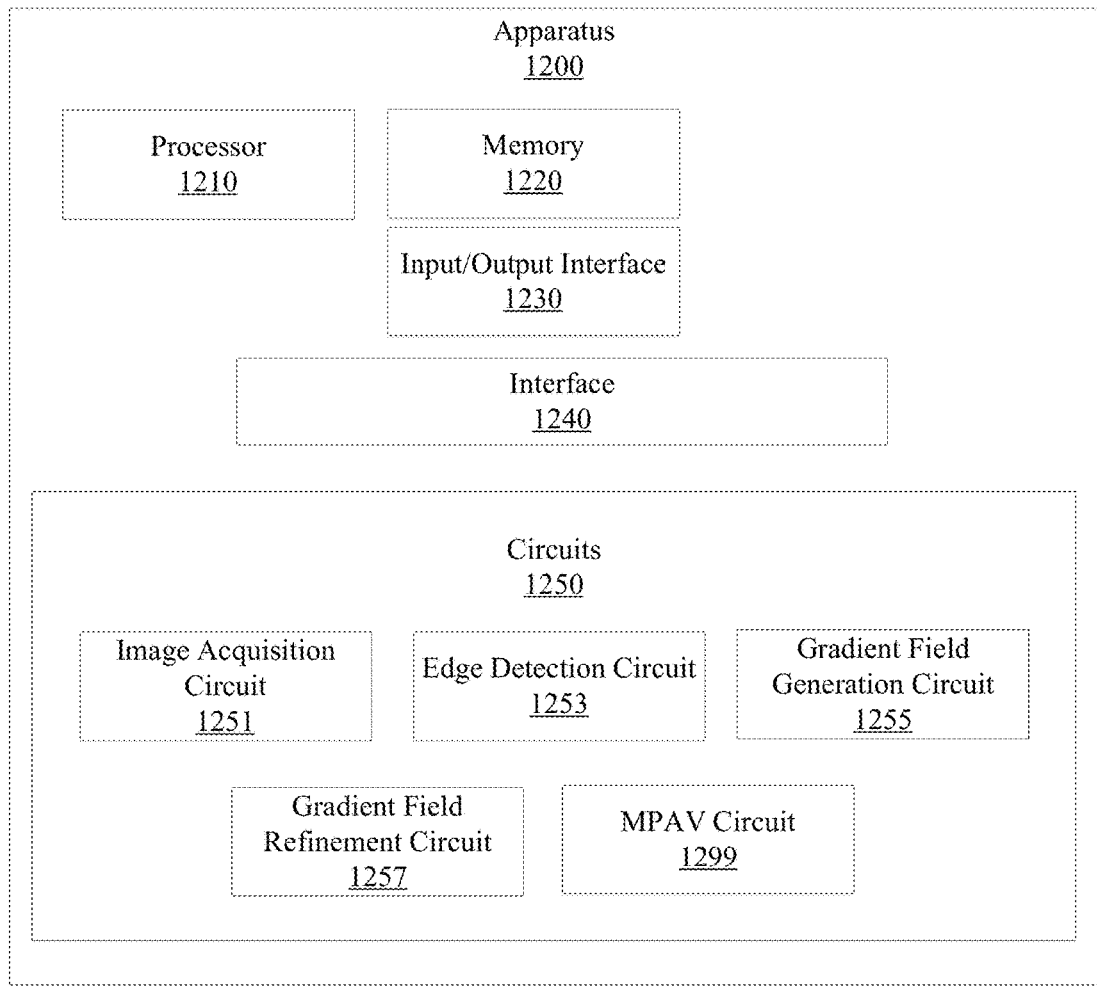
FIG. 12 illustrates an example apparatus for detecting cellular nuclei.

FIG. 12 illustrates an example apparatus 1200 for detecting cellular nuclei represented in a digital histopathology image. Apparatus 1200 includes a processor 1210, a memory 1220, an input/output (I/O) interface 1230, a set of circuits 1250, and an interface 1240 that connects the processor 1210, the memory 1220, the I/O interface 1230, and the set of circuits 1250. The set of circuits 1250 includes an image acquisition circuit 1251, an edge detection circuit 1253, a gradient field generation circuit 1255, a gradient field refinement circuit 1257, and a multi-pass adaptive voting (MPAV) circuit 1259. In one embodiment, the functionality associated with the set of circuits 1250 may be performed, at least in part, by hardware logic components including, but not limited to, field-programmable gate arrays (FPGAs), application specific integrated circuits (ASICs), application specific standard products (ASSPs), system on a chip systems (SOCs), or complex programmable logic devices (CPLDs). In one embodiment, individual members of the set of circuits 1250 are implemented as ASICs or SOCs.

Image acquisition circuit 1251 acquires a histopathology image of a region of tissue. The histopathology image may be acquired from, for example, a digital whole slide scanner. The histopathology image includes a plurality of pixels. The region of tissue may be a section of tissue demonstrating cancerous pathology in a patient. The image of the region of tissue may include an image of a nodule, a tumor, or other region of interest. In one embodiment, the image is a digital image of an H&E stained breast cancer tissue slide, a digital image of a CD31 antibody and H&E stained breast cancer tissue slide, or a digital image of a Ki-67 stained skin cancer tissue slide. Other imaging approaches may be used to generate and access the image accessed by image acquisition circuit 1251. Other image modalities, dimensions, pixel sizes, or resolutions may also be used.

Edge detection circuit 1253 generates a nuclear edge map. Edge detection circuit 1253 generates the nuclear edge map based, at least in part, on the histopathology image. The nuclear edge map includes a subset of the plurality of pixels. Edge detection circuit 1253 generates a single stain image based on the histopathology image. In one embodiment, edge detection circuit 1253 may generate the single stain image using an unsupervised sparse non-negative matrix factorization based color deconvolution technique to separate different stains. In one embodiment, edge detection circuit 1253 generates a smoothed image by convolving the single stain image with a Guassian kernel. Generating a smoothed image reduces image noise, thereby improving edge detection performance. In one embodiment, edge detection circuit 1253 generates the nuclear edge map based on the single stain image using a Canny operator edge detection approach. In another embodiment, another different edge detection approach may be employed.

Gradient field generation circuit 1255 generates a gradient field based, at least in part, on the nuclear edge map. The gradient field includes a gradient for a member of the subset of the plurality of pixels. In one embodiment, gradient field generation circuit 1255 computes an inverse gradient for a member of subset of the plurality of pixels based on an X axis gradient associated with the member of subset of the plurality of pixels, and a Y axis gradient associated with the member of subset of the plurality of pixels. For example, an inverse gradient G may be generated as:

$$G(x, y) = \left( -\frac{dI_s(x, y)}{dx}, -\frac{dI_s(x, y)}{dy} \right),$$

where $$\frac{dI_s(x, y)}{dx}$$

represents the gradient along the X axis, and $$\frac{dI_s(x, y)}{dy}$$

represent the gradient along the Y axis.

Gradient field refinement circuit 1257 generates a refined gradient field based, at least in part, on the gradient field. Gradient field refinement circuit 1257 computes a convex hull based on an edge in the edge map. Gradient field refinement circuit 1257 identifies a centroid for the convex hull. Gradient field refinement circuit 1257 computes a pixel-centroid vector based on the co-ordinates of the member of subset of the plurality of pixels and the co-ordinates of the centroid. Gradient field refinement circuit 1257 also computes an angular difference between the inverse gradient and the pixel-centroid vector. Gradient field refinement circuit 1257 refines the gradient field map by adaptively refining the inverse gradients that will be included in the voting procedure. In one embodiment, gradient field refinement circuit 1257, upon determining that angular difference is less than a threshold amount, reverses the inverse gradient. In another embodiment, gradient field refinement circuit 1257, upon determining that angular difference is less than a threshold amount, discards the inverse gradient. In another embodiment, gradient field refinement circuit 1257 may, upon determining that a first angular difference associated with a first inverse gradient is less than a threshold amount, discard the first inverse gradient, and, upon determining that a second angular difference associated with a second inverse gradient is less than the threshold amount, reverse the second inverse gradient. In another embodiment, gradient field refinement circuit 1257, upon determining that angular difference is less than a threshold amount, changes the inverse gradient direction by a user-defined amount.

Multi-pass adaptive voting (MPAV) circuit 1259 generates a nuclear voting map based on the refined gradient field. MPAV circuit 1259 identifies a cellular nucleus in the histopathology image based on the nuclear voting map and a global threshold, where the nuclear voting map includes a pixel. In one embodiment, MPAV circuit 1259 iteratively adaptively generates the nuclear voting map. In this embodiment, MPAV circuit 1259 initializes a set of voting parameters. The set of voting parameters includes a radial maximum range, a maximum angular range, and an iteration number. The iteration number may be, for example, an integer N. In one embodiment, N=3. The radial maximum range and maximum angular range may be used to define an active voting region. In one embodiment, the radial maximum range=40. Other values for N and the radial maximum range may be employed.

MPAV circuit 1259 updates the nuclear voting map based on the active voting region and a kernel associated with the pixel. The active voting region is based, at least in part, on the maximum angular range and an angular range based on the radial maximum range. FIG. 6 illustrates an exemplary active voting region. MPAV circuit 1259 iteratively updates a voting direction associated with the pixel. MPAV circuit 1259 also iteratively updates the angular range. For example, MPAV circuit 1259 may iteratively update the voting direction and iteratively update the angular range N times. In one embodiment, MPAV circuit 1259 computes the global threshold using an automated Ostu's method. In another embodiment, MPAV circuit 1259 computes the global threshold using another, different approach.

In one embodiment of apparatus 1200, the set of circuits 1250 also includes a display circuit. The display circuit may control a CADx system, an automated cell counting system, or computer to display the histopathology image, the nuclear edge map, the gradient field, the refined gradient field, or the nuclear voting map on a computer monitor, a smartphone display, a tablet display, or other displays. Displaying the histopathology image, the nuclear edge map, the gradient field, the refined gradient field, or the nuclear voting map may also include printing the histopathology image, the nuclear edge map, the gradient field, the refined gradient field, or the nuclear voting map. The display circuit may also control the CADx system or automated cell counting system to display an image of the region of tissue. The image of the region of tissue may include a single stain image, an edge map, or a binary or voting image of the region. By displaying histopathology image, the nuclear edge map, the gradient field, the refined gradient field, or the nuclear voting map, example apparatus provide a timely and intuitive way for a human pathologist, an automated cell counting system, or a CADx system to more accurately classify pathologies demonstrated by a patient by more accurately detecting cellular nuclei, thus improving on conventional approaches to detecting cellular nuclei in a histopathology image.

FIG. 13 illustrates a method 1300 for detecting nuclei in a histopathology image. Method 1300 includes, at 1310, accessing a digital image of a stained tissue slide. The digital image includes a set of pixels. The digital image may be a digital image of a hematoxylin and eosin (H&E) stained breast cancer tissue slide, a digital image of a CD31 antibody and H&E stained breast cancer tissue slide, or a digital image of a Ki-67 stained skin cancer tissue slide. In another embodiment, the digital image may be an image of a different type of cancer, or may be stained with a different stain technique.

Method 1300 also includes, at 1320, generating a gradient field based on the digital image. The gradient field may be based on a smoothed image and an edge map generated from the smoothed image. Method 1300 reduces image noise by smoothing the digital image. Method 1300 also detects a nuclear edge in the smoothed digital image, where the nuclear edge defines a convex hull. The nuclear edge includes a pixel. Method 1300 also at 1320, computes an inverse gradient associated with a pixel in the nuclear edge, and includes the inverse gradient in the gradient field.

Method 1300 also includes, at 1330, generating a refined gradient field. Method 1300 generates the refined gradient field by computing an angular difference between the inverse gradient in the gradient field and a vector derived from the convex hull centroid defined by the nuclear edge and the pixel. Upon determining that the angular difference is greater than a threshold angular difference, method 1300, at 1330, reverses the direction of the inverse gradient.

Method 1300 also includes, at 1340, generating a voting image based on the refined gradient field. Generating the voting image includes, for a pixel in a nuclear edge represented in the edge map, computing a voting image based, at least in part, on an active voting area and on a kernel.

Method 1300 also includes, at 1350, adaptively iteratively updating the voting image. Adaptively iteratively updating the voting image includes adaptively iteratively updating a parameter used to define an active voting area. For example, method 1300, at 1350, may iteratively adjust the angular range used to define the active voting area.

Method 1300 also includes, at 1360, computing a global threshold. The global threshold may be computed using an automated Ostu's threshold approach. In one embodiment, the global threshold may be computed using another, different approach.

Method 1300 further includes, at 1370, identifying a cellular nuclei based on the global threshold and the voting image. In one embodiment, method 1300 further includes controlling an automated tissue grading system to count the cellular nuclei identified in the digital image.

Figure 14:
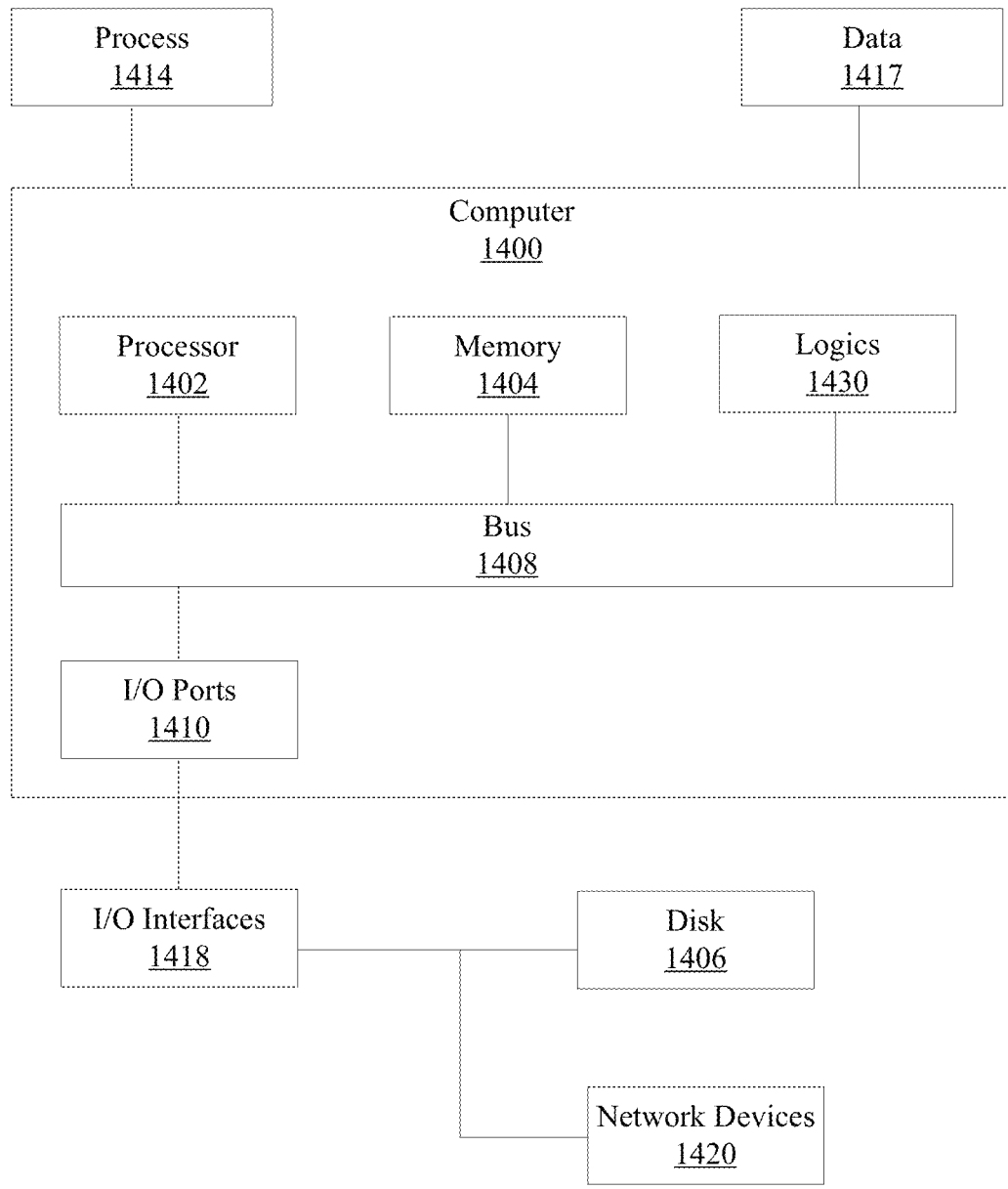
FIG. 14 illustrates an example computer in which example methods and apparatus may operate.

FIG. 14 illustrates an example computer 1400 in which example methods illustrated herein can operate and in which example circuits or logics may be implemented. In different examples, computer 1400 may be part of a digital whole slide scanner, may be operably connectable to a digital whole slide scanner system, or may be part of an automated tissue grading system, an automated cell counting system, or a CADx system.

Computer 1400 includes a processor 1402, a memory 1404, and input/output ports 1410 operably connected by a bus 1408. In one example, computer 1400 may include a set of logics 1430 that perform a method (e.g. method 700, method 800, method 1300) of detecting nuclei represented in a histopathology image. Thus, the set of logics 1430, whether implemented in computer 1400 as hardware, firmware, software, and/or a combination thereof may provide means (e.g., hardware, software) for detecting nuclei represented in a histopathology image. In different examples, the set of logics 1430 may be permanently and/or removably attached to computer 1400. In one embodiment, the functionality associated with the set of logics 1430 may be performed, at least in part, by hardware logic components including, but not limited to, field-programmable gate arrays (FPGAs), application specific integrated circuits (ASICs), application specific standard products (ASSPs), system on a chip systems (SOCs), or complex programmable logic devices (CPLDs). In one embodiment, individual members of the set of logics 1430 are implemented as ASICs or SOCs.

Processor 1402 can be a variety of various processors including dual microprocessor and other multi-processor architectures. Memory 1404 can include volatile memory and/or non-volatile memory. A disk 1406 may be operably connected to computer 1400 via, for example, an input/output interface (e.g., card, device) 1418 and an input/output port 1410. Disk 1406 may include, but is not limited to, devices like a magnetic disk drive, a tape drive, a Zip drive, a solid state device (SSD), a flash memory card, or a memory stick. Furthermore, disk 1406 may include optical drives like a CD-ROM or a digital video ROM drive (DVD ROM). Memory 1404 can store processes 1414 or data 1417, for example. Disk 1406 or memory 1404 can store an operating system that controls and allocates resources of computer 1400.

Bus 1408 can be a single internal bus interconnect architecture or other bus or mesh architectures. While a single bus is illustrated, it is to be appreciated that computer 1400 may communicate with various devices, logics, and peripherals using other busses that are not illustrated (e.g., PCIE, SATA, Infiniband, 1394, USB, Ethernet).

Computer 1400 may interact with input/output devices via I/O interfaces 1418 and input/output ports 1410. Input/output devices can include, but are not limited to, digital whole slide scanners, an optical microscope, a keyboard, a microphone, a pointing and selection device, cameras, video cards, displays, disk 1406, network devices 1420, or other devices. Input/output ports 1410 can include but are not limited to, serial ports, parallel ports, or USB ports.

Computer 1400 may operate in a network environment and thus may be connected to network devices 1420 via I/O interfaces 1418 or I/O ports 1410. Through the network devices 1420, computer 1400 may interact with a network. Through the network, computer 1400 may be logically connected to remote computers. The networks with which computer 1400 may interact include, but are not limited to, a local area network (LAN), a wide area network (WAN), or other networks.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage device", as used herein, refers to a device that stores instructions or data. "Computer-readable storage device" does not refer to propagated signals. A computer-readable storage device may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage device may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a solid state device (SSD), a memory stick, a data storage device, and other media from which a computer, a processor or other electronic device can read.

"Circuit", as used herein, includes but is not limited to hardware, firmware, software in execution on a machine, or combinations of each to perform a function(s) or an action(s), or to cause a function or action from another circuit, method, or system. Circuit may include a software controlled microprocessor, a discrete logic (e.g., ASIC), an analog circuit, a digital circuit, a programmed logic device, a memory device containing instructions, and other physical devices. Circuit may include one or more gates, combinations of gates, or other circuit components. Where multiple logical circuits are described, it may be possible to incorporate the multiple circuits into one physical logic or circuit. Similarly, where a single logical circuit is described, it may be possible to distribute that single circuit between multiple logics or circuits.

To the extent that the term "includes" or "including" is employed in the detailed description or the claims, it is intended to be inclusive in a manner similar to the term "comprising" as that term is interpreted when employed as a transitional word in a claim.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A non-transitory computer-readable storage device storing computer executable instructions that when executed by a computer control the computer to perform a method for detecting nuclei in a histopathological image, the method comprising:
    accessing a digital histopathology image, where the digital histopathology image includes a plurality of pixels;
    generating a gradient field map based on the histopathology image;
    generating a refined gradient field map based on the gradient field map;
    calculating a voting map for a member of the plurality of pixels based, at least in part, on the refined gradient field map and a voting kernel;
    generating an aggregated voting map based on the voting map;
    computing a global threshold; and
    identifying a nuclear centroid based on the global threshold and the aggregated voting map.

2. The non-transitory computer-readable storage device of claim 1, where the digital histopathology image is a digital image of a hematoxylin and eosin (H&E) stained breast cancer tissue slide, a digital image of a CD31 antibody and H&E stained breast cancer tissue slide, or a digital image of a Ki-67 stained skin cancer tissue slide.

3. The non-transitory computer-readable storage device of claim 1, where generating the gradient field map includes:

generating a single stain image based on the histopathology image using sparse non-negative matrix factorization (SNMF) color deconvolution; and generating a smooth image by convolving the single stain image with a Guassian kernel.

4. The non-transitory computer-readable storage device of claim 3, where generating the gradient field map further includes:

generating an edge map based on the digital histopathology image, the single stain image, or the smooth image, where the edge map includes a nuclear edge, where the nuclear edge includes an edge pixel; and computing an inverse gradient for the edge pixel.

5. The non-transitory computer-readable storage device of claim 4, where generating the edge map based on the digital histopathology image, the single stain image, or the smooth image includes defining the nuclear edge using a Canny operator.

6. The non-transitory computer-readable storage device of claim 4, where generating the refined gradient field map comprises:

computing a convex hull center associated with a fragment of the edge map, where the fragment of the edge map includes at least one pixel;

computing an inverse gradient for a pixel in the fragment of the edge map;

computing a first vector, where the first vector is derived from the pixel and the center of the convex hull;

computing an angle difference between the inverse gradient and the first vector;

upon determining that the angle difference is less than a threshold magnitude:

classifying the pixel as an invalid voting pixel, removing the pixel from the gradient field map, and removing the inverse gradient from the gradient field map; or upon determining that the angle difference is less than a threshold magnitude:

classifying the pixel as a valid voting pixel, and setting the direction of the inverse gradient to the opposite direction.

7. The non-transitory computer-readable storage device of claim 6, where the threshold magnitude is $\pi/2$ radians.

8. The non-transitory computer-readable storage device of claim 6, where calculating the voting map comprises:

initializing a set of voting parameters for a pixel, where the pixel is a member of the refined gradient field map, where the set of voting parameters includes a radial maximum range, a maximum angular range, and an iteration number;

computing a vote image for the pixel based, at least in part, on the set of voting parameters and the voting kernel; and updating a voting direction for the pixel.

9. The non-transitory computer-readable storage device of claim 8, where the radial maximum range is forty, and the iteration number is three.

10. The non-transitory computer-readable storage device of claim 8, where the global threshold is computed using an automated Otsu's threshold approach.

11. The non-transitory computer-readable storage device of claim 8, where identifying a nuclear centroid based on the global threshold and the aggregated voting map includes generating a binary image from the aggregated voting map using the global threshold, where the binary image includes a plurality of connected components, and where a centroid of a connected component in the binary image is identified as a nucleus.

12. The non-transitory computer-readable storage device of claim 1, where identifying a nuclear centroid based on the global threshold and the aggregated voting map includes identifying a nuclear centroid to within a range of less than 3.7 µm or 15 pixels of a manually labeled centroid of the same histopathology image.

13. An apparatus for detecting cellular nuclei in a histopathology image, comprising:

a processor;
a memory;
an input/output interface;
a set of circuits; and
an interface to connect the processor, the memory, the input/output interface and the set of circuits, where the set of circuits includes:

an image acquisition circuit that acquires a histopathology image, where the histopathology image includes a plurality of pixels;

an edge detection circuit that generates an nuclear edge map based, at least in part, on the histopathology image, where the nuclear edge map includes a subset of the plurality of pixels;

a gradient field generation circuit that generates a gradient field based, at least in part, on the nuclear edge map, where the gradient field generation circuit computes an inverse gradient for a member of the subset of the plurality of pixels;

a gradient field refinement circuit that generates a refined gradient field based, at least in part, on the gradient field; and a multi-pass adaptive voting (MPAV) circuit that iteratively generates a nuclear voting map based on the refined gradient field, and that identifies a cellular nucleus in the histopathology image based on the nuclear voting map and a global threshold, where the nuclear voting map includes a pixel.

14. The apparatus of claim 13, where the image is a digital image of a hematoxylin and eosin (H&E) stained breast cancer tissue slide, a digital image of a CD31 antibody and H&E stained breast cancer tissue slide, or a digital image of a Ki-67 stained skin cancer tissue slide.

15. The apparatus of claim 13, where the edge detection circuit:

generates a single stain image based on the histopathology image;

generates a smoothed image by convolving the single stain image with a Guassian kernel; and generates the nuclear edge map based on the single stain image using a Canny operator edge detection approach, or another, different edge detection approach.

16. The apparatus of claim 15, where the gradient field generation circuit computes the inverse gradient for a member of the subset of the plurality of pixels based on an X axis gradient associated with the member of the subset of the plurality of pixels, and a Y axis gradient associated with the member of the subset of the plurality of pixels.

17. The apparatus of claim 16, where the gradient field refinement circuit:

computes a convex hull based on an edge in the edge map;
identifies a centroid for the convex hull;
computes a pixel-centroid vector based on co-ordinates of the member of the subset of the plurality of pixels and co-ordinates of the centroid;

computes an angular difference between the inverse gradient and the pixel-centroid vector; and upon determining that the angular difference is less than a threshold amount:
reverses the inverse gradient, or deletes the inverse gradient and the pixel.

18. The apparatus of claim 17, where the threshold amount is $\pi/2$ radians.

19. The apparatus of claim 17 where the MPAV circuit:
initializes a set of voting parameters, where the set of voting parameters includes a radial maximum range, a maximum angular range, and an iteration number;
updates the nuclear voting map based on an active voting region and a kernel associated with the pixel, where the active voting region is based, at least in part, on the maximum angular range and an angular range based on the radial maximum range;
updates a voting direction associated with the pixel; and
updates the angular range.

20. A method for detecting cellular nuclei in a medical image, the method comprising:
accessing a digital image of a stained tissue slide, where the digital image includes a set of pixels;
generating a gradient field based on the digital image by producing a smoothed digital image and by detecting a nuclear edge in the smoothed digital image, where the nuclear edge defines a convex hull, where the nuclear edge includes a pixel, where the gradient field includes an inverse gradient associated with the pixel in the nuclear edge, where the convex hull has a centroid;
generating a refined gradient field by computing an angular difference between the inverse gradient and a vector derived from the convex hull centroid and the pixel;
upon determining that the angular difference is greater than a threshold angular difference:
reversing the direction of the inverse gradient;
generating a voting image based on the refined gradient field;
adaptively iteratively updating the voting image;
computing a global threshold;
identifying a cellular nucleus based on the global threshold and the voting image; and
controlling an automated tissue grading system to count cellular nuclei identified in the digital image.

* * * * *